(12) United States Patent
Cross et al.

(10) Patent No.: US 10,365,705 B2
(45) Date of Patent: Jul. 30, 2019

(54) SYSTEM AND METHODS FOR PRIORITIZED MULTI-NODE SERVER AND INFRASTRUCTURE AVAILABILITY DURING POWER CAPACITY LOSS

(71) Applicant: Dell Products L.P., Round Rock, TX (US)

(72) Inventors: Kyle E. Cross, Austin, TX (US); Aaron Michael Rhinehart, Pflugerville, TX (US); Binay A. Kuruvila, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 131 days.

(21) Appl. No.: 15/380,813

(22) Filed: Dec. 15, 2016

(65) Prior Publication Data
US 2018/0173295 A1    Jun. 21, 2018

(51) Int. Cl.
*G06F 1/30* (2006.01)
*G06F 1/3287* (2019.01)
*G06F 1/3212* (2019.01)

(52) U.S. Cl.
CPC .............. *G06F 1/3287* (2013.01); *G06F 1/30* (2013.01); *G06F 1/3212* (2013.01)

(58) Field of Classification Search
None
See application file for complete search history.

(56) References Cited

U.S. PATENT DOCUMENTS

| | | | | |
|---|---|---|---|---|
| 6,209,088 | B1 * | 3/2001 | Reneris | G06F 1/3203 713/1 |
| 2007/0220291 | A1 * | 9/2007 | Stufflebeam | G06F 1/3203 713/320 |
| 2011/0256891 | A1 * | 10/2011 | Soliman | H04W 68/12 455/458 |
| 2012/0079299 | A1 * | 3/2012 | Cepulis | G06F 1/183 713/320 |
| 2015/0268305 | A1 * | 9/2015 | Wang | G06F 9/4401 713/323 |
| 2017/0329638 | A1 | 11/2017 | Ragupathi et al. | |
| 2018/0011524 | A1 | 1/2018 | Stumpf et al. | |
| 2018/0032390 | A1 | 2/2018 | Rahmanian et al. | |

* cited by examiner

*Primary Examiner* — Paul Yen
(74) *Attorney, Agent, or Firm* — Jackson Walker L.L.P.

(57) ABSTRACT

A method may include monitoring a power capacity of power supply units of a chassis, responsive to determining that the power capacity is lesser than a first minimum power capacity required for full operation of all of the modular information handling systems and information handling resources of the chassis and greater than a threshold power capacity for triggering operation in a minimal operational state of the chassis, causing at least one of the plurality of modular information handling systems and the information handling resources to reduce power consumption, and responsive to determining that the power capacity is lesser than the threshold power capacity and greater than a second minimum power capacity for a minimal operational state of the modular information handling systems and information handling resources, causing at least one of the plurality of modular information handling systems and the information handling resources to operate in the minimal operational state.

14 Claims, 3 Drawing Sheets

200
SYSTEM AND METHODS FOR PRIORITIZED MULTI-NODE SERVER AND INFRASTRUCTURE AVAILABILITY DURING POWER CAPACITY LOSS

TECHNICAL FIELD

The present disclosure relates in general to information handling systems, and more particularly to systems and methods for determining appropriate load reduction actions in response to a power capacity loss.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In enterprise computing applications having multiple information handling systems, "up time," or the amount of time an information handling system is powered on and available, of a system is often a critical concern. This concern is often more critical in a modular chassis infrastructure in which a chassis comprises multiple modular information handling systems (sometimes referred to as "nodes") and down time of a chassis affects many information handling systems. One parameter that affects up time is the availability of sufficient power capacity in a chassis. Under certain fault scenarios, power capacity within a chassis can fall below that needed to power all components in the chassis, which may lead to full chassis shutdown, loss of access to offline nodes, and loss of unsaved data.

SUMMARY

In accordance with the teachings of the present disclosure, the disadvantages and problems associated with existing approaches to determining appropriate load reduction actions during a power capacity excursion.

In accordance with embodiments of the present disclosure, a method may include monitoring a power capacity of available power supply units of a chassis comprising a plurality of modular information handling systems, comparing the power capacity to a first minimum power capacity required for full operation of all of the modular information handling systems and information handling resources of the chassis, comparing the power capacity to a threshold power capacity for triggering operation in a minimal operational state of the modular information handling systems and information handling resources of the chassis, comparing the power capacity to a second minimum capacity for required for the minimal operational state of the modular information handling systems and information handling resources of the chassis, responsive to determining that the power capacity is lesser than the first minimum power capacity and greater than the threshold power capacity, causing at least one of the plurality of modular information handling systems and the information handling resources of the chassis to reduce power consumption, and responsive to determining that the power capacity is lesser than the threshold power capacity and greater than the second minimum power capacity, causing at least one of the plurality of modular information handling systems and the information handling resources of the chassis to operate in the minimal operational state.

In accordance with these and other embodiments of the present disclosure, a system may include one or more information handling resources configured to monitor a power capacity of available power supply units of a chassis comprising a plurality of modular information handling systems, compare the power capacity to a first minimum power capacity required for full operation of all of the modular information handling systems and information handling resources of the chassis, compare the power capacity to a threshold power capacity for triggering operation in a minimal operational state of the modular information handling systems and information handling resources of the chassis, compare the power capacity to a second minimum capacity for the minimal operational state of the modular information handling systems and information handling resources of the chassis, responsive to determining that the power capacity is lesser than the first minimum power capacity and greater than the threshold power capacity, cause at least one of the plurality of modular information handling systems and the information handling resources of the chassis to reduce power consumption, and responsive to determining that the power capacity is lesser than the threshold power capacity and greater than the second minimum power capacity, cause at least one of the plurality of modular information handling systems and the information handling resources of the chassis to operate in the minimal operational state.

In accordance with these and other embodiments of the present disclosure, a chassis may include a plurality of modular information handling systems, information handling resources communicatively coupled to the plurality of information handling systems, a plurality of power supply units. The information handling resources may comprise at least one information handling resource configured to monitor a power capacity of available power supply units of a chassis comprising a plurality of modular information handling systems, compare the power capacity to a first minimum power capacity required for full operation of all of the modular information handling systems and information handling resources of the chassis, compare the power capacity to a threshold power capacity for triggering operation in a minimal operational state of the modular information handling systems and information handling resources of the chassis, compare the power capacity to a second minimum capacity for required for the minimal operational state of the modular information handling systems and information handling resources of the chassis, responsive to determining that the power capacity is lesser than the first minimum power capacity and greater than the threshold power capacity, cause at least one of the plurality of modular information handling systems and the information handling resources of the chassis to reduce power consumption, and responsive to determining that the power capacity is lesser than the threshold power capacity and greater than the second minimum power capacity, cause at least one of the plurality of modular information handling systems and the information handling resources of the chassis to operate in the minimal operational state.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
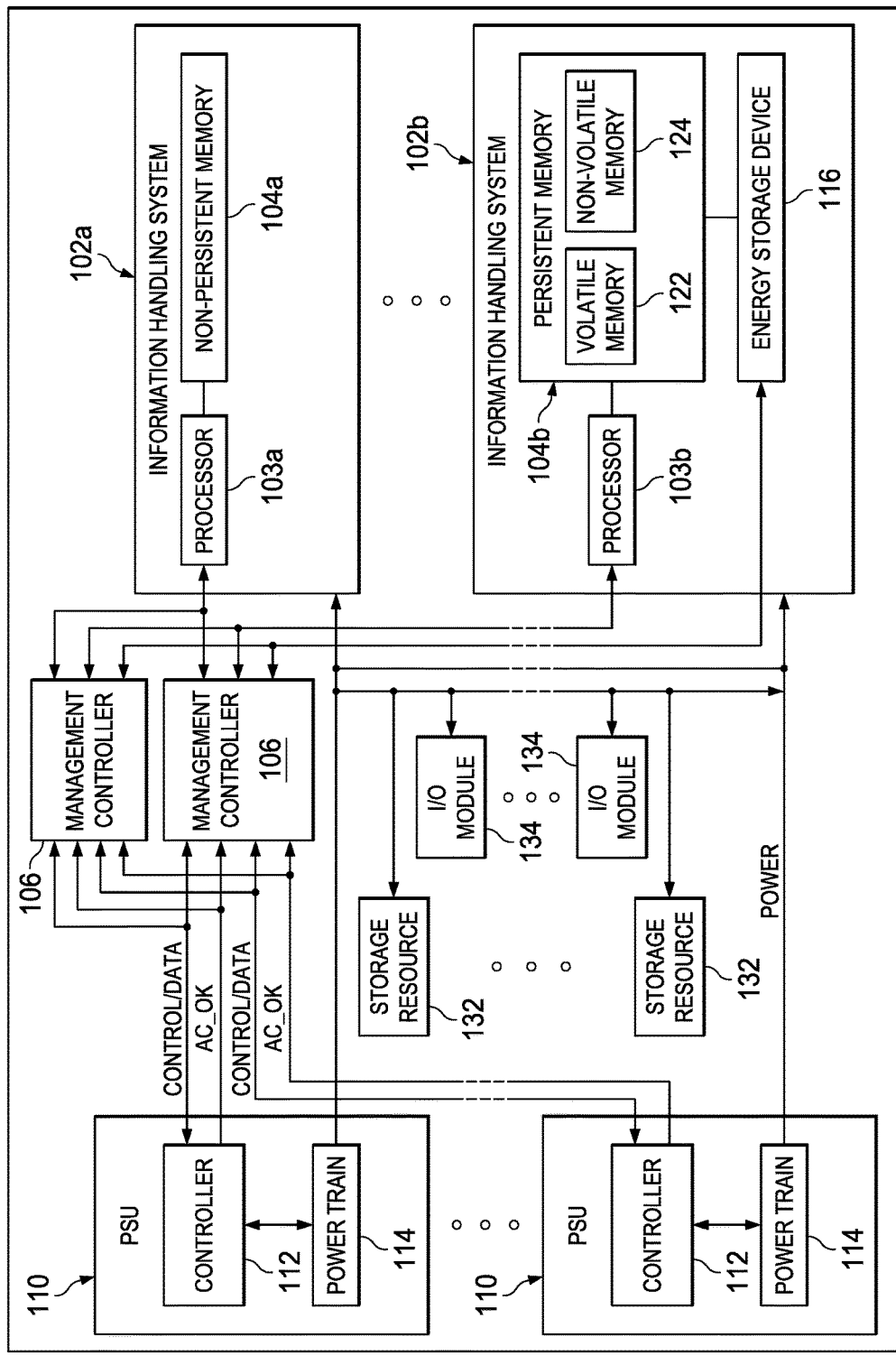
FIG. 1 illustrates a block diagram of an example chassis comprising multiple modular information handling systems, in accordance with embodiments of the present disclosure.
Figure 2:
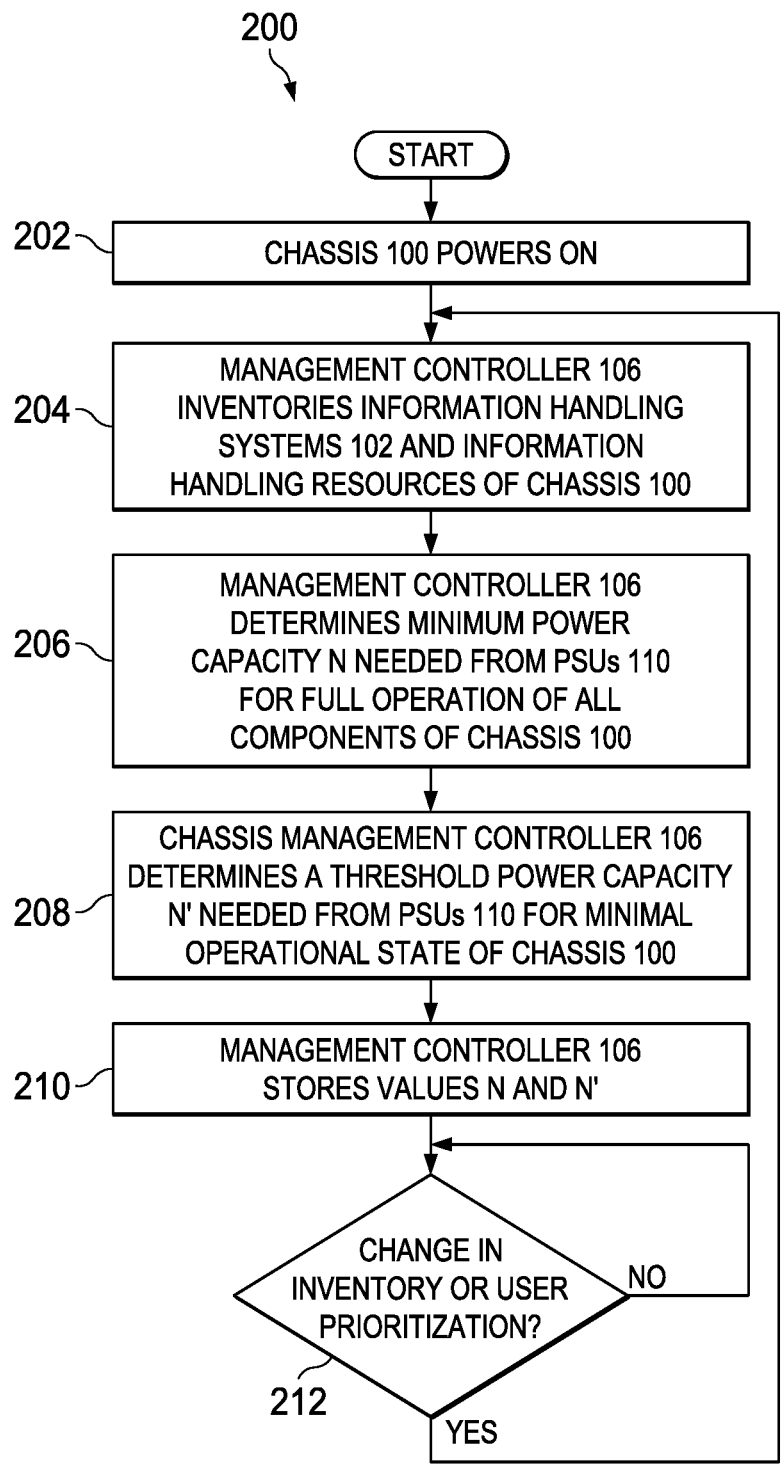
FIG. 2 illustrates a flow chart of an example method for determining power capacity requirements of a chassis, in accordance with embodiments of the present disclosure.
Figure 3:
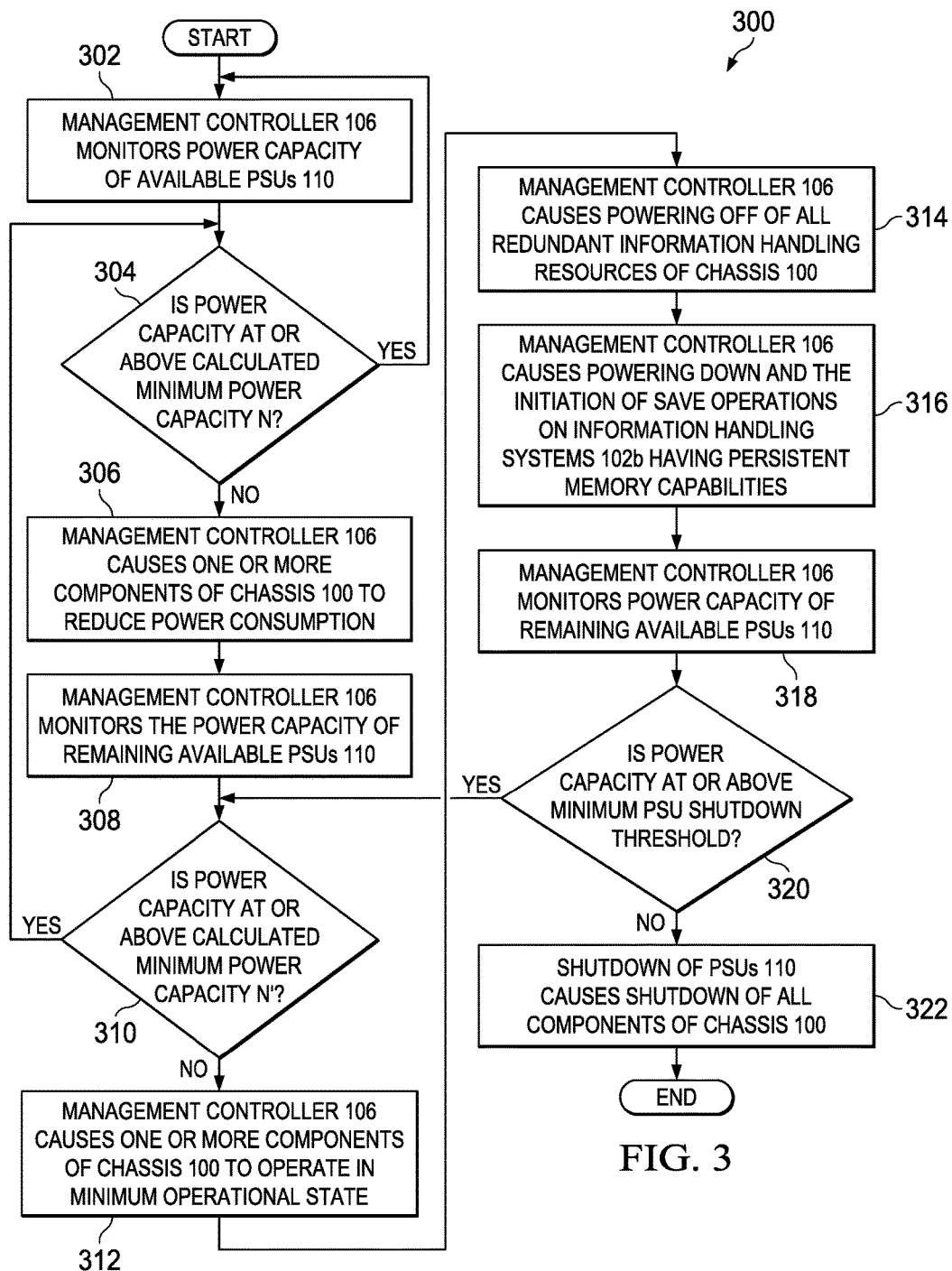
FIG. 3 illustrates a flow chart of an example method for prioritized multi-node server and infrastructure availability during a power capacity loss, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a server, a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example chassis 100 comprising multiple modular information handling systems 102 (e.g., information handling system 102a and information handling system 102b) and multiple modular information handling resources, such as, for example, storage resources 132 and input/output (I/O) modules 134. Chassis 100 may comprise an enclosure that serves as a container for various information handling systems 102 and information handling resources, and may be constructed from steel, aluminum, plastic, and/or any other suitable material. Although the term "chassis" is used, chassis 100 may also be referred to as a case, cabinet, tower, box, enclosure, and/or housing. In certain embodiments, chassis 100 may be configured to hold and/or provide power to a plurality of information handling systems 102 and/or information handling resources. As depicted in FIG. 1, chassis 100 may include a plurality of information handling systems 102, one or more management controllers 106, and a plurality of power supply units (PSUs) 110.

As depicted, an information handling system 102a may include a processor 103a, a non-persistent memory 104a communicatively coupled to processor 103a, and one or more other information handling resources.

Processor 103a may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103a may interpret and/or execute program instructions and/or process data stored in non-persistent memory 104a and/or another component of information handling system 102a.

Non-persistent memory 104a may be communicatively coupled to processor 103a and may comprise any system, device, or apparatus operable to retain program instructions or data for a period of time. Non-persistent memory 104a may comprise random access memory (RAM), electrically erasable programmable read-only memory (EEPROM), a PCMCIA card, flash memory, magnetic storage, opto-magnetic storage, or any suitable selection and/or array of volatile memory.

In addition to processor 103a and memory 104a, information handling system 102a may include one or more other information handling resources.

Also as depicted, an information handling system 102b may include a processor 103b, a persistent memory 104b communicatively coupled to processor 103b, an energy storage device 116, and one or more other information handling resources.

Processor 103b may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103b may interpret and/or execute program instructions and/or process data stored in persistent memory 104b and/or another component of information handling system 102b.

Persistent memory 104b may be communicatively coupled to processor 103b and may comprise any system, device, or apparatus operable to retain program instructions or data for a period of time. Persistent memory 104b may comprise random access memory (RAM), electrically erasable programmable read-only memory (EEPROM), a PCM-CIA card, flash memory, magnetic storage, opto-magnetic storage, or any suitable selection and/or array of volatile memory or non-volatile memory configured to retain data after power is withdrawn from information handling system 102b. As shown in FIG. 1, persistent memory 104b may include a volatile memory 122 (e.g., DRAM or other volatile random-access memory) and a non-volatile memory 124 (e.g., flash memory or other non-volatile memory). During normal operation, when PSUs 110 provide adequate power to components of information handling system 102b, data written to persistent memory 104b from processor 103b may be stored in volatile memory 112. However, in the event of loss of system input power or a power fault of one or more PSUs 110 that prevents delivery of electrical energy from PSUs 110 to memory 104b, data stored in volatile memory 112 may be transferred to non-volatile memory 124 in a save operation. After input power is restored, or a faulty PSU 110 is replaced, such that PSUs 110 are again operable to provide electrical energy to information handling resources of information handling system 102b, on the subsequent power-on of information handling system 102b, data may be copied from the non-volatile memory 124 back to volatile memory 112 via a restore operation. The combined actions of data save and then data restore, allows the data to remain persistent through a power disruption. Accordingly, although not explicitly shown in FIG. 1, persistent memory 104b may also include hardware, firmware, and/or software for carrying out such save operations.

Although the foregoing contemplates use of a particular type of persistent memory (e.g., persistent memory including volatile memory 122 and non-volatile memory 124), it is understood that persistent memory 104b may be implemented using any suitable type of persistent memory that causes data to remain persistent across an AC power loss in response to an early notification that an AC power event has occurred.

Energy storage device 116 may comprise any system, device, or apparatus configured to store energy which may be used by persistent memory 104b to perform save operations in response to a loss of system input power source (e.g., alternating current input source) or power fault of one or more PSUs 110. In some embodiments, energy storage device 116 may comprise a battery configured to convert stored chemical energy into electrical energy. In other embodiments, energy storage device 116 may comprise a capacitor or "supercap" configured to store electrical energy and deliver such electrical energy to persistent memory 104b when needed to perform save operations (e.g., by closure of a switch to electrically couple such capacitor to components of persistent memory 104b). Although energy storage device 116 is shown in FIG. 1 as external to persistent memory 104b, in some embodiments energy storage device 116 may be integral to persistent memory 104b. In these and other embodiments, energy storage device 116 may be charged from one or more PSUs 110. In some embodiments, energy storage device 116 may be communicatively coupled to management controller 106 via a systems management interface such as, for example, Inter-Integrated Circuit (i2C), System Management Bus (SMBus) or Power Management Bus (PMBus), allowing management controller 106 to receive health and status (e.g., state of charge) from and/or communicate commands to energy storage device 116. In some embodiments, energy storage device 116 may provide energy to a plurality of persistent memory 104b devices. Although energy storage device 116 may be required to implement certain types of persistent memory, in embodiments that use a type of persistent memory other than that depicted herein, information handling system 102b may not include energy storage device 116.

In addition to processor 103b, memory 104b, and energy storage device 116, information handling system 102b may include one or more other information handling resources.

A management controller 106 may be configured to provide out-of-band management facilities for management of information handling systems 102, PSUs 110, storage resources 132, I/O modules 134, and/or one or more other information handling resources of chassis 100. Such management may be made by management controller 106 even if chassis 100 and components thereof are powered off or powered to a standby state. A management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, a management controller 106 may be configured to communicate with each PSU 110 to communicate control and/or telemetry data between such management controller 106 and such PSU 110. For example, a PSU 110 may communicate information regarding status and/or health of such PSU 110 and/or measurements of electrical parameters (e.g., electrical currents or voltages) present within such PSU 110. As shown in FIG. 1, chassis 100 may include a plurality of management controllers 106 arranged in a redundant fashion, thus allowing failover in the event of a fault in the operation of one of the management controllers 106.

Generally speaking, a PSU 110 may include any system, device, or apparatus configured to supply electrical current to information handling systems 102, management controller 106, storage resources 132, I/O modules 134, and/or one or more other information handling resources of chassis 100. For example, in some embodiments, each PSU 110 may drive electrical current to a power bus from which information handling systems 102, management controller 106, and/or one or more other information handling resources of chassis 100 draw electrical energy for operation. In some embodiments, PSUs 110 may be configured in a redundant configuration, such that in the event of a failure of a PSU 110 or failure of an alternating current power source to one or more PSUs 110, sufficient power may be provided by remaining PSUs 110 in order to adequately power components of information handling system 102.

A storage resource 132 may include any system, device, or apparatus configured to store data. A storage resource 132 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. Although not shown in FIG. 1 for the purposes of clarity and exposition, a storage resource 132 may be communicatively coupled to one or more information handling systems 102, to management controller 106, and/or one or more other information handling resources of chassis 100.

An I/O module 134 may comprise any system, device, or apparatus configured to facilitate communication between an information handling system 102 and a user interface device (e.g., a keyboard, mouse, or display) and/or between an information handling system 102 and another information handling system external to chassis 100 (e.g., wherein such I/O module may comprise a network interface card or switch).

In addition to information handling systems 102, management controller 106, PSUs 110, storage resources 132, and I/O modules 134, chassis 100 may include one or more other information handling resources. For example, although FIG. 1 depicts chassis 100 having only a single information handling system 102a, in some embodiments chassis 100 may include a plurality of information handling systems 102a. As another example, although FIG. 1 depicts chassis 100 having only a single information handling system 102b, in some embodiments chassis 100 may include a plurality of information handling systems 102b. As a further example, although FIG. 1 depicts chassis 100 having only two PSUs 110, in some embodiments chassis 100 may include more PSUs 110.

In operation, in order to maximize up time of nodes (e.g., individual information handling systems 102), management controller 106 may be configured to intelligently activate persistent memory saves (e.g., in persistent memory 104b) and powering down of redundant information handling resources (e.g., redundant management controllers 106, redundant storage resources 132, redundant I/O modules 134, other redundant systems management modules, redundant input/output fabric modules, not explicitly shown in FIG. 1) of chassis 100. For example, at power up of chassis 100, management controller 106 may determine, based on power requirements of all information handling systems 102 and all information handling resources of chassis 100, a minimum power capacity N needed from PSUs 110 for full operation of all components of chassis 100, and also determine a threshold power capacity N' from PSUs 110 that will trigger a minimal operational state of chassis 100 such that in the minimal operational state, information handling systems 102 with persistent memory capabilities (e.g., information handling system 102b) may be powered down after initiating save operations on such persistent memory-enabled systems, redundant information handling resources (e.g., redundant management controllers 106, redundant storage resources 132, redundant I/O modules 134) of chassis 100 are powered down, and all non-redundant information handling resources and all information handling systems 102 without persistent memory capability (e.g., information handling system 102a) remain powered on. Thus, the minimal operational state may be thought of as a "fight for life" state in which up time is maintained for critical non-redundant components of chassis 100 and user-prioritized information handling systems 102a without persistent memory capabilities. Accordingly, operating in minimal operational state may provide sufficient up time for a period of time to allow for repair or replacement of failed PSUs 110 or restoration of AC grid input power to PSUs 110 in order to return chassis 100 to the minimum number N of PSUs 110 needed for full operation of all components of chassis 100, without loss of operation or data. In some embodiments, the minimal operational state may account for user prioritizations and/or settings relating to information handling systems 102 and information handling resources.

FIG. 2 illustrates a flow chart of an example method 200 for determining power capacity requirements of chassis 100, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, chassis 100 may power on. At step 204, management controller 106 may inventory information handling systems 102 and information handling resources of chassis 100. At step 206, based on the inventory, management controller 106 may determine a minimum power capacity N needed from PSUs 110 for full operation of all components of chassis 100.

At step 208, based on the inventory (and in some embodiments, user prioritizations of information handling systems 102 and information handling resources), chassis management controller 106 may determine a threshold power capacity N' from PSUs 110 that will trigger a minimal operational state of chassis 100 such that in the minimal operational state, information handling systems 102 with persistent memory capabilities (e.g., information handling system 102b) may be powered down to allow save operations to take place on such persistent memory-enabled systems, redundant information handling resources (e.g., redundant management controllers 106, redundant storage resources 132, redundant I/O modules 134) of chassis 100 are powered down, and all non-redundant information handling resources and all user-prioritized information handling systems 102 without persistent memory capability (e.g., information handling system 102a) remain powered on.

At step 210, management controller 106 may store the values N and N' (e.g., in a computer-readable medium integral to or otherwise accessible to management controller 106).

At step 212, management controller 106 may determine whether a change has been made to the inventory of chassis 100 and/or if a change has been made to any user prioritizations with respect to information handling systems 102 and/or information handling resources of chassis 100. If an inventory and/or prioritization change has been made, method 200 may proceed again to step 204. Otherwise, method 200 may remain at step 212 until an inventory and/or prioritization change has been made.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using management controller 106 or any other system operable to implement method 200. In certain embodiments, method 200 may be implemented partially or fully in software and/or firmware embodied in computer-readable media.

FIG. 3 illustrates a flow chart of an example method 300 for prioritized multi-node server and infrastructure availability during a power capacity loss, in accordance with embodiments of the present disclosure. According to some embodiments, method 300 may begin at step 302. As noted above, teachings of the present disclosure may be implemented in a variety of configurations of chassis 100. As such, the preferred initialization point for method 300 and the order of the steps comprising method 300 may depend on the implementation chosen.

At step 302, management controller 106 may monitor the power capacity of available PSUs 110. At step 304, management controller 106 may determine if the power capacity is at or above a calculated minimum power capacity N needed from PSUs 110 for full operation of all components of chassis 100. If the power capacity is below the minimum power capacity N needed from PSUs 110 for full operation of all components of chassis 100, method 300 may proceed to step 306. Otherwise, if the power capacity is at or above the minimum power capacity N needed from PSUs 110 for full operation of all components of chassis 100, method 300 may proceed again to step 302 and continue monitoring the power capacity of available PSUs 110 until the power capacity of available PSUs 110 falls below the minimum power capacity N (e.g., in response to a failure or fault of one or more PSUs 110).

At step 306, in response to the power capacity falling below the minimum power capacity N, management controller 106 may cause one or more components of chassis 100 to reduce or "throttle" their power consumption. At step 308, also in response to the power capacity falling below the minimum power capacity N, management controller 106 may continue monitoring the power capacity of remaining available PSUs 110.

At step 310, management controller 106 may determine if the power capacity is at or above a calculated threshold power capacity N' of PSUs 110 for triggering the minimal operational state of chassis 100. If the power capacity is below the threshold power capacity N', method 300 may proceed to step 312. Otherwise, if the power capacity is at or above the threshold power capacity N' needed from PSUs 110 for the minimal operational state of chassis 100, method 300 may proceed to step 304.

At step 312, in response to the power capacity transitioning below the threshold power capacity N', management controller 106 may cause one or more components of chassis 100 to operate in the minimum operational state. Accordingly, at step 314, management controller 106 may cause powering off of all redundant information handling resources of chassis 100 (e.g., redundant management controllers 106, redundant storage resources 132, redundant I/O modules 134) and at step 316, may cause powering down and the initiation of save operations on information handling systems 102b having persistent memory capabilities. Thus, the remaining critical information handling systems 102a without persistent memory capabilities and the non-redundant information handling resources of chassis 100 needed for operation of such information handling systems 102a remain powered by PSUs 110 having power capacity between that of the threshold power capacity N' and a PSU shutdown threshold, described in greater detail below with respect to step 320.

At step 318, management controller 106 may continue monitoring the power capacity of remaining available PSUs 110. At step 320, individual PSUS 110 may determine if their power capacity is at or above a minimum PSU shutdown threshold needed from PSUs 110 (e.g., when the individual rated outputs of PSUs 110 are exceeded). If the power capacity is below the minimum PSU shutdown threshold, method 300 may proceed to step 322. Otherwise, if the power capacity is at or above minimum PSU shutdown threshold, method 300 may return to step 310 and management controller 106 may continue monitoring the power capacity of remaining available PSUs 110 until the power capacity of available PSUs 110 rises above the threshold power capacity N' or below the minimum PSU shutdown threshold (e.g., in response to an additional failure or fault of one or more remaining available PSUs 110). In some embodiments, step 322 may be implemented by management controllers 106.

At step 322, in response to the power capacity falling below minimum PSU shutdown threshold, PSUs 110 may shut down and all components of chassis 100 may shut down, including the initiation or, if applicable, continuation of save operations for information handling systems 102b having persistent memory capabilities. After completion of step 322, method 300 may end. In some embodiments, step 322 may be implemented by management controllers 106.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using management controller 106 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:

monitoring a power capacity of available power supply units of a chassis comprising a plurality of modular information handling systems, wherein each modular information handling system in a first subset of the modular information handling systems has persistent memory capability, and wherein each modular information handling system in a second subset of the modular information handling systems does not have persistent memory capability, such that a power failure in the second subset is operable to cause data loss;

comparing the power capacity to a first minimum power capacity required for full operation of all of the modular information handling systems and information handling resources of the chassis;

comparing the power capacity to a threshold power capacity for triggering operation in a minimal operational state of the modular information handling systems and information handling resources of the chassis;

comparing the power capacity to a second minimum power capacity for the minimal operational state of the modular information handling systems and information handling resources of the chassis, wherein the second minimum power capacity is the capacity required to provide power to the modular information handling systems in the second subset of the modular information handling systems and to non-redundant information handling resources of the chassis;

responsive to determining that the power capacity is less than the first minimum power capacity, causing at least one of the plurality of modular information handling systems and the information handling resources of the chassis to reduce power consumption; and responsive to determining that the power capacity is less than the threshold power capacity and greater than the second minimum power capacity, causing the plurality of modular information handling systems and the information handling resources of the chassis to operate in the minimal operational state, wherein operating in the minimal operational state includes the modular information handling systems in the first subset of the modular information handling systems transferring data from volatile storage to persistent storage and then shutting down.

2. The method of claim 1, wherein causing at least one of the plurality of modular information handling systems and the information handling resources of the chassis to operate in the minimal operational state comprises powering off redundant information handling resources of the chassis.

3. The method of claim 1, further comprising:

inventorying the plurality of modular information handling systems and the information handling resources of the chassis; and determining the first minimum power capacity and the threshold power capacity based on the inventorying.

4. The method of claim 1, further comprising responsive to determining that the power capacity is less than the second minimum power capacity, causing the plurality of modular information handling systems and the information handling resources of the chassis to power down.

5. A system comprising one or more information handling resources configured to:

monitor a power capacity of available power supply units of a chassis comprising a plurality of modular information handling systems, wherein each modular information handling system in a first subset of the modular information handling systems has persistent memory capability, and each modular information handling system in a second subset of the modular information handling systems does not have persistent memory capability, such that a power failure in the second subset is operable to cause data loss;

compare the power capacity to a first minimum power capacity required for full operation of all of the modular information handling systems and information handling resources of the chassis;

compare the power capacity to a threshold power capacity for triggering operation in a minimal operational state of the modular information handling systems and information handling resources of the chassis;

compare the power capacity to a second minimum power capacity for the minimal operational state of the modular information handling systems and information handling resources of the chassis, wherein the second minimum power capacity is the capacity required to provide power to the modular information handling systems in the second subset of the modular information handling systems and to non-redundant information handling resources of the chassis;

responsive to determining that the power capacity is less than the first minimum power capacity and greater than the threshold power capacity, cause at least one of the plurality of modular information handling systems and the information handling resources of the chassis to reduce power consumption; and responsive to determining that the power capacity is less than the threshold power capacity and greater than the second minimum power capacity, cause the plurality of modular information handling systems and the information handling resources of the chassis to operate in the minimal operational state, wherein operating in the minimal operational state includes the modular information handling systems in the first subset of the modular information handling systems transferring data from volatile storage to persistent storage and then shutting down.

6. The system of claim 5, wherein one or more information handling resources are further configured to cause at least one of the plurality of modular information handling systems and the information handling resources of the chassis to operate in the minimal operational state by powering off redundant information handling resources of the chassis.

7. The system of claim 5, wherein the one or more information handling resources are further configured to:

inventory the plurality of modular information handling systems and the information handling resources of the chassis; and determine the first minimum power capacity and the threshold power capacity based on the inventorying.

8. The system of claim 5, wherein the one or more information handling resources are further configured to, responsive to determining that the power capacity is less than the second minimum power capacity, cause the plurality of modular information handling systems and the information handling resources of the chassis to power down.

9. The system of claim 5, wherein at least one of the information handling resources is a chassis management controller.

10. A chassis comprising:
a plurality of modular information handling systems;
information handling resources communicatively coupled to the plurality of information handling systems;
a plurality of power supply units; and
the information handling resources comprising at least one information handling resource configured to:
monitor a power capacity of available power supply units of a chassis comprising a plurality of modular information handling systems, wherein each modular information handling system in a first subset of the modular information handling systems has persistent memory capability, and each modular information handling system in a second subset of the modular information handling systems does not have persistent memory capability, such that a power failure in the second subset is operable to cause data loss;
compare the power capacity to a first minimum power capacity required for full operation of all of the modular information handling systems and information handling resources of the chassis;
compare the power capacity to a threshold power capacity for triggering operation in a minimal operational state of the modular information handling systems and information handling resources of the chassis;
compare the power capacity to a second minimum power capacity for required for the minimal operational state of the modular information handling systems and information handling resources of the chassis, wherein the second minimum power capacity is the capacity required to provide power to the modular information handling systems in the second subset of the modular information handling systems and to non-redundant information handling resources of the chassis;
responsive to determining that the power capacity is less than the first minimum power capacity and greater than the threshold power capacity, cause at least one of the plurality of modular information handling systems and the information handling resources of the chassis to reduce power consumption; and
responsive to determining that the power capacity is less than the threshold power capacity and greater than the second minimum power capacity, cause the plurality of modular information handling systems and the information handling resources of the chassis to operate in the minimal operational state, wherein operating in the minimal operational state includes the modular information handling systems in the first subset of the modular information handling systems transferring data from volatile storage to persistent storage and then shutting down.

11. The chassis of claim 10, wherein the at least one information handling resource is further configured to cause at least one of the plurality of modular information handling systems and the information handling resources to operate in the minimal operational state by powering off redundant information handling resources.

12. The chassis of claim 10, wherein at least one information handling resource is further configured to:
inventory the plurality of modular information handling systems and the information handling resources; and
determine the first minimum power capacity and the threshold power capacity based on the inventorying.

13. The chassis of claim 10, wherein at least one information handling resource is further configured to, responsive to determining that the power capacity is less than the second minimum power capacity, cause the plurality of modular information handling systems and the information handling resources to power down.

14. The chassis of claim 10, wherein at least one information handling resource comprises a chassis management controller.

* * * * *